United States Patent Office 3,641,083
Patented Feb. 8, 1972

3,641,083
CHROMIUM COMPLEXES OF FLUOROISO-
ALKOXYALKYL CARBOXYLIC ACIDS
Louis G. Anello, Basking Ridge, Edward Michael
Boghosian, Fort Lee, Edward S. Jones, Whippany,
Pritam S. Minhas, Morris Plains, Alson K. Price, Morristown, and Richard F. Sweeney, Randolph Township,
Dover, N.J., assignors to Allied Chemical Corporation,
New York, N.Y.
No Drawing. Filed Nov. 1, 1968, Ser. No. 772,831
Int. Cl. C11c 3/00; C07f 11/00
U.S. Cl. 260—438.5 C
14 Claims

ABSTRACT OF THE DISCLOSURE

Chromium complexes of fluorocarbon carboxylic acids characterized by having a polyfluoroisoalkoxyalkyl tail wherein an ether oxygen links a fluorinated carbon atom connected to two fluoroalkyl groups and a —$CF_2CF_2$— group. These chromium complexes are useful to impart oil and water resistance to various substrates including paper, leather, and the like.

---

This invention relates to novel chromium complexes of fluorocarbon carboxylic acids which are useful for treating a wide variety of substrates to impart oil and water resistance thereto. More particularly, this invention relates to chromium complexes of fluorocarbon carboxylic acids having a polyfluoroisoalkoxyalkyl tail, wherein an ether oxygen atom links a fluorinated carbon atom connected to two fluoroalkyl groups and at least one —$CF_2CF_2$— group.

The fluorocarbon carboxylic acids used in making the chromium complexes of the present invention have the formula:

(1) 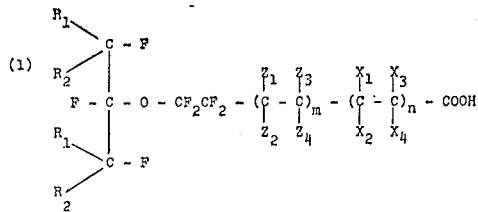

wherein $R_1$ and $R_2$ independently can be fluorine, chlorine, perfluoroalkyl or together can form a cyclic perfluoroalkylene group, with the proviso that both $R_1$ and $R_2$ cannot be chlorine; $Z_1$, $Z_2$, $Z_3$ and $Z_4$ are independently hydrogen, fluorine or chlorine, providing that no more than two of $Z_1$–$Z_4$ are chlorine; $X_1$, $X_2$, $X_3$ and $X_4$ independently can be hydrogen, chlorine, or fluorine providing that no more than one of $X_1$–$X_4$ is chlorine; $m$ and $n$ are integers from 0–75 and the sum of $m$ and $n$ is 0–75. Preferably $m$ and $n$ are integers from 0–10.

The criticality in the structure of the above-described acids is in the polyfluoroisoalkoxyalkyl tail portion of the molecule wherein an ether oxygen atom links a fluorinated carbon atom attached to two fluoroalkyl groups and at least one —$CF_2CF_2$— group.

The above-described acids can be prepared from their corresponding polyhaloisoalkoxyalkyl iodides. The iodides and their preparation are disclosed in detail in copending U.S. application Ser. No. 633,359 filed Apr. 25, 1967.

These telomers are prepared by reacting polyhaloisoalkoxyalkyl iodides of the formula:

(2) 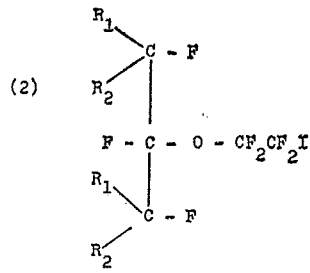

wherein $R_1$ and $R_2$ have the meanings given above, with telomerizable unsaturated compounds having the formulas $Z_1Z_2C\!=\!CZ_3Z_4$ and/or $X_1X_2C\!=\!CX_3X_4$ wherein $Z_1$–$Z_4$ and $X_1$–$X_4$ have the meanings given above. Suitable telomerizable compounds include ethylene, tetrafluoroethylene, chlorodifluoroethylene, difluoroethylene and the like. The telomerization reaction can be initiated by heat or by a free radical initiator.

The polyhaloisoalkoxyalkyl iodides can be prepared by reacting an appropriate halogenated ketone with an ionizable fluoride salt, e.g. CsF or KF, to form a fluorinated organic salt and reacting the organic salt with tetrafluoroethylene and iodine. Preparation of the polyhaloisoalkoxyalkyl iodides is described in copening U.S. applications of Litt et al.; Ser. Nos. 492,276 filed Oct. 1, 1965 and 513,574 filed Dec. 13, 1965. The pertinent subject matter of these applications is hereby incorporated by reference.

The following series of equations will serve to further illustrate the preparation of the iodides, wherein $R_1$, $R_2$, $Z_1$–$Z_4$, $X_1$–$X_4$, $m$ and $n$ have the meanings given above.

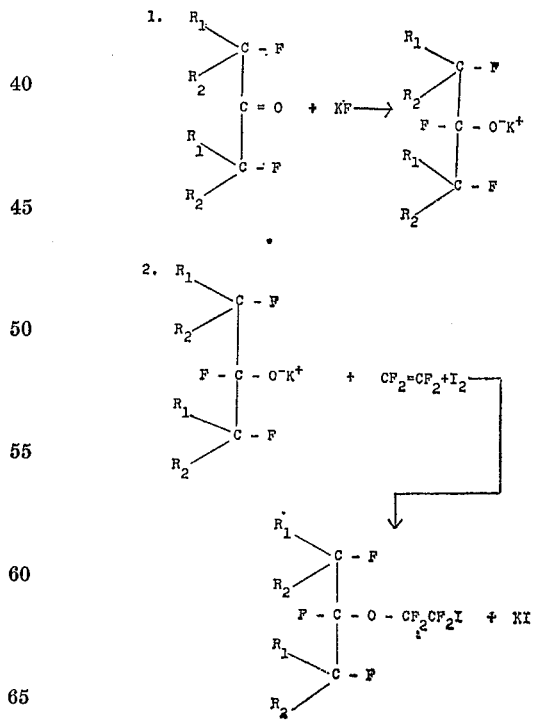

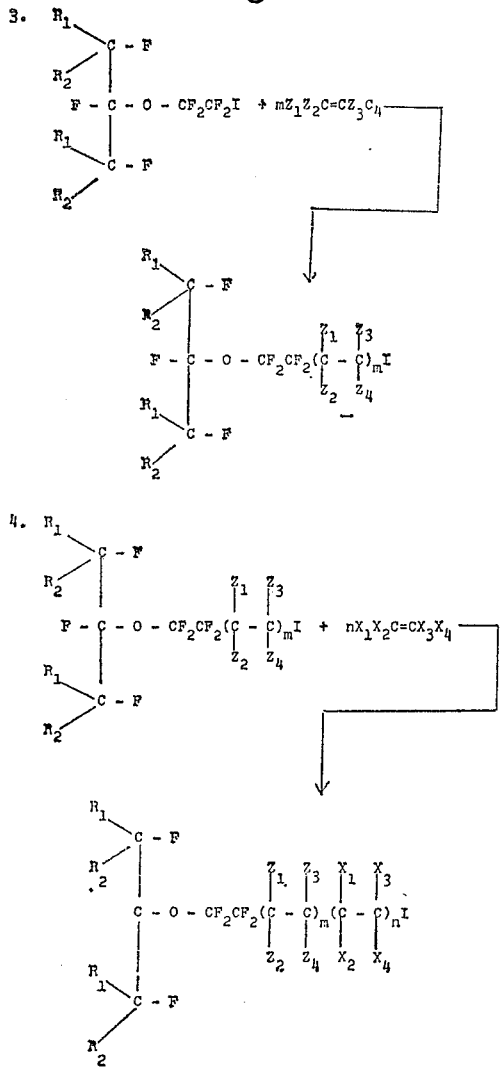

It will be understood that when $m$ and/or $n$ is 0, the applicable telomerization Equations 3 and/or 4 are omitted.

Fluorocarbon carboxylic acids of the general Formula 1 wherein $X_3$ and $X_4$ are both hydrogen can be prepared by reacting a polyhaloisoalkoxyalkyl iodide as described above with a water-soluble cyanide to form the corresponding nitrile. Any water-soluble metal cyanide can be employed in this reaction, including sodium cyanide, potassium cyanide, lithium cyanide, cuprous cyanide, etc. Excellent results are obtained with sodium cyanide. Preferably 1–3 mols of cyanide per mol of telomer iodide are employed. Larger amounts can be employed but are of no advantage.

The reaction time is not critical and is dependent upon the temperature employed. Since the yield of nitrile increases at higher temperatures of reaction, when low reaction temperatures are employed, longer reaction times will be required for optimum conversion. Generally reaction for from 0.5 to 5 hours is satisfactory.

The reaction between the iodide and the alkali metal cyanide is preferably carried out in the presence of a solvent. Good yields are obtained at temperatures between about 60–120° C., preferably up to about 90° C. Atmospheric pressure can be employed most conveniently, but super-atmospheric pressure can be employed to good advantage in some cases to improve the conversion and/or yield. Suitable solvents for the reaction are water-soluble, polar solvents such as ethanol, diethylene glycol, dimethylformamide, dimethylsulfoxide and the like. Excellent results are obtained with dimethylsulfoxide. The solvent should be present in sufficient amount to afford an easily stirrable mixture of the alkali metal cyanide, telomer iodide and resultant salt by-product. Suitably, at least about one mol of solvent is employed per mol of alkali metal cyanide.

The product can be purified by conventional means. The product is washed with water to remove solvent, by-product salt and unreacted alkali metal cyanide. The oily product can be fractionally distilled to further purify it, as will be known to one skilled in the art.

The nitrile can be hydrolyzed to the corresponding free acid by well-known methods. An aqueous mineral acid, such as concentrated hydrochloric, 30–80%/ by weight sulfuric or phosphoric acids can be employed. The reaction can be carried out at normal temperatures and is preferably conducted at about the reflux temperature of the mixture. Generally, from 1–10, preferably from 5–10 mols of acid per mol of nitrile is employed. The crude acid can be further purified in conventional manner.

The above-described fluorocarbon carboxylic acids can also be prepared by reacting a suitable polyhaloisoalkoxyalkyl iodide with a terminally unsaturated hydrocarbon carboxylic acid or its corresponding ester to form the corresponding iodocarboxylic acid or ester. This reaction can be catalyzed by a free radical initiator such as heat or ultraviolet light but preferably a catalyst such as a peroxide or an azonitrile is employed. These initiators are well known. This reaction can be illustrated by the following equation:

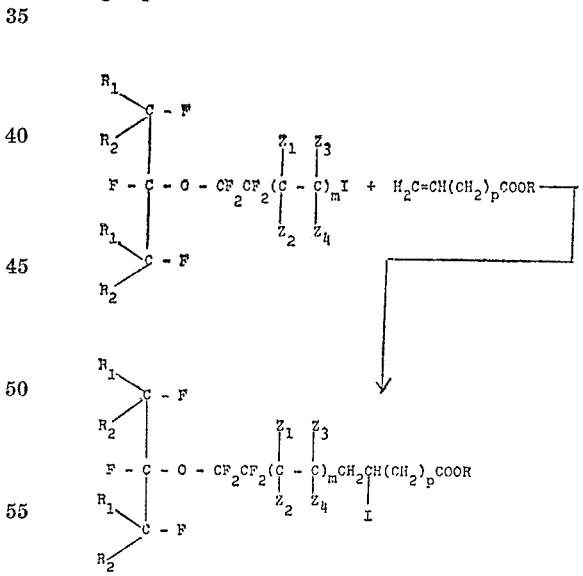

wherein $R_1$, $R_2$, $Z_1$–$Z_4$ and $m$ have the meanings given above, $p$ is an integer and R can be hydrogen or an alkyl group. The resultant iodocarboxylic acid or ester can be reduced in conventional manner, as with zinc in alcohol. The ester can be hydrolyzed to the free acid in known manner. Alternatively, the iodo ester can be dehydrohalogenated with alkali to the corresponding alkenoic acid and hydrogenated in known manner, as with hydrogen in the presence of a catalyst, such as platinum oxide. This method is described by N. O. Brace, J. Org. Chem., 27 4491 (1962).

Fluorocarbon carboxylic acids can be prepared from polyhaloisoalkoxyalkyl iodides as described hereinabove having a terminal —$CH_2CH_2I$ group by elimination of HI from the terminal group to form the corresponding terminal olefin and oxidizing the olefin. These reactions are illustrated below:

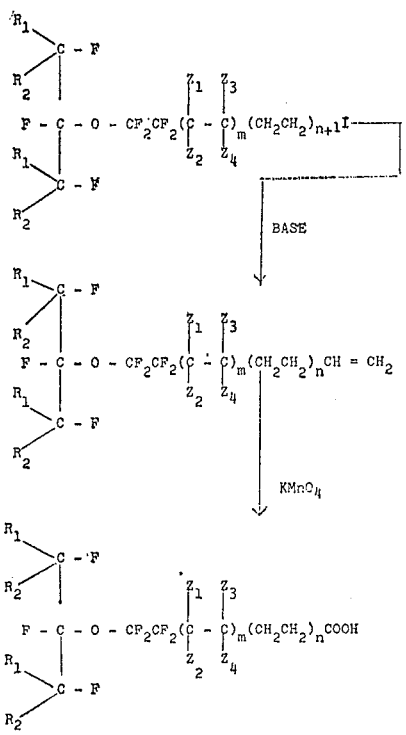

wherein $R_1$, $R_2$, $Z_1$–$Z_4$, $m$ and $n$ have the meanings given above.

The elimination of the terminal HI can be carried out in the presence of a strong base such as an alkali metal hydroxide or an amine in the presence of a water-miscible solvent such as alcohol, dimethylformamide, dimethylsulfoxide, acetonitrile, dioxane and the like. The resultant olefin can be oxidized in a well-known manner, as with permanganate or dichromate solutions. This process is described in greater detail in copending U.S. application of Anello et al., Ser. No. 721,113 filed Apr. 12, 1968. The pertinent subject matter of this copending application is hereby incorporated by reference.

Fluorocarbon carboxylic acids of the general formula (1) wherein $X_3$ and $X_4$ are both fluorine, can be prepared by reacting a suitable polyhaloisoalkoxylkyl iodide with $(CN)_2$ under super atmospheric pressure of from about 20–200 atmospheres at temperatures of about 300° C. or more, preferably 350–400° C. to form the nitrile. Optimum yields of the nitrile will be obtained when an excess of cyanide is present. The nitrile can be hydrolyzed to the free acid by well-known means.

The preparation of the fluorocarbon carboxylic acids is described in greater detail in copending application of Anello et al., U.S. Ser. No. 721,115, filed Apr. 12, 1968. The pertinent subject matter of that application is hereby incorporated by reference.

According to the preferred embodiment of the invention, chromium complexes of acids having the formula

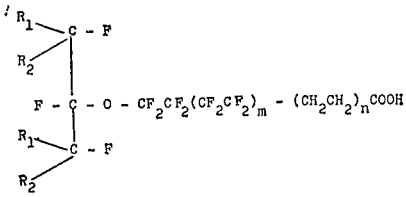

wherein $R_1$ and $R_2$ are fluorine or perfluoroalkyl of 1–2 carbon atoms $m$ and $n$ are integers from 0–10, are particularly effective as sizing compounds for paper and as leather treating agents.

Other methods of preparing the subject fluorocarbon carboxylic acids will be known to one skilled in tthe art.

The chromium complexes of the fluorocarbon carboxylic acids described above are Werner-type coordination complexes. They are prepared by reacting a suitable acid as hereinabove described with chromyl chloride in an anhydrous solvent in the presence of a reducing agent, as well as by other methods known in the art.

The molar ratio of the acid to chromyl chloride is not critical and can vary over a wide range but generally from about 2 to about 20 mols of chromyl chloride per mol of acid is employed.

The reducing agents preferred are alcohols, which can also be employed as the solvent for the reaction. Suitable alcohols include aliphatic alcohols such as methanol, ethanol, propanol, isopropanol, butanol, isopentanol and the like. Excellent results are obtained with isopropanol. In addition to an alcohol solvent, other inert, anhydrous solvents can also be employed, including haloalkanes such as carbon tetrachloride, chloroform, sym-dichloroethane and the like. The presence of an inert solvent is advantageous in avoiding excessive reaction temperatures since the reaction between the acid and chromyl chloride is exothermic. In a preferred mode of operation, the chromyl chloride is dissolved in an inert solvent such as carbon tetrachloride and the solution is added slowly to the acid solution, maintaining the temperature at or near the reflux temperature of the reaction mixture.

The resultant green solution contains the chromium complexes of the acid. The chromium complexes can be isolated as a green solid but preferably are used directly in the solvent in which they were prepared. The alcoholic solution can be employed as is, diluted further with an alcohol or acetone, or part of the solvent can be evaporated by known means to obtain a more concentrated stock solution. A small amount of water is added advantageously to the stock solution to stabilize the solution and prevent precipitation of complex solids upon standing.

The chromium complexes of the invention are useful to impart oil and water resistance to various substrates, including paper, cellulosic films, wood, leather, textile fibers, yarns and fabrics, ceramic products, metals such as aluminum, rubber, and the like. The resultant articles show excellent oil and water repellancy.

The chromium complexes of the invention also impart release properties to a variety of substrates including paper, rubber, plastics, metal, glass and the like. They are particularly effective as release agents for paper. They can be applied as a coating from about 0.5 to about 3.0% by weight solutions in water to coated or uncoated papers, kraft papers, glassine and the like.

Dilute aqueous solutions, containing from about .01 to about 10% by weight of chromium complex solids, are particularly effective as sizes for paper. Papers coated with a small amount of the chromium complexes of the invention show excellent water and ink resistance, and superior oil repellency. The treated papers are outstanding for use as protective packaging materials, etc.

The invention will be further illustrated by the following examples, but it is to be understood that the invention is not meant to be limited to the details disclosed therein. In the examples, all parts and percentages are by weight unless otherwise noted.

In the examples, the relative penetration of ink to paper is determined by the ink flotation test according to the following procedure: a 1.5 inch square of treated paper is folded to turn up all the edges. The square is floated on standard writing ink. The time in seconds required for the ink to penetrate evenly to the upper surface of the paper is noted as the ink penetration. A time of 900 seconds or longer denotes excellent ink resistance.

The water repellency of treated papers is determined according to standard test T441-os-63 of the Technical Association of the Pulp and Paper Industry (Cobb Test). This test determines the amount of water absorbed by the paper after two minutes. A value of 20–25 or lower indicates excellent water resistance.

The oil resistance of treated papers is determined by the following: A kit of 12 solutions of varying proportions of castor oil, toluene and heptane is prepared, as set forth in the following table. A value of 12 shows superior oil repellency.

| Kit No. | Parts by volume of | | |
|---|---|---|---|
| | Castor oil | Toluene | Heptane |
| 1 | 200 | 0 | 0 |
| 2 | 180 | 10 | 10 |
| 3 | 160 | 20 | 20 |
| 4 | 140 | 30 | 30 |
| 5 | 120 | 40 | 40 |
| 6 | 100 | 50 | 50 |
| 7 | 80 | 60 | 60 |
| 8 | 60 | 70 | 70 |
| 9 | 40 | 80 | 80 |
| 10 | 20 | 90 | 90 |
| 11 | 0 | 100 | 100 |
| 12 | 0 | 90 | 110 |

The kit value is the highest numbered solution that will stand on the surface to be tested in the form of a drop for 15 seconds, with no penetration of the solution, noted by any darkening of the area under the drop.

Leather is tested for oil, water, and chemical repellency according to the following tests: static water absorption is determined by immersing a 2″ x 2″ piece of the leather to be tested in water to a depth of one inch for one hour. The specimen can be kept below the surface by weighted hooks or by hooks held to a magnet. The surface water is blotted off, and the sample is reweighed. The water absorption is determined according to the follow equation:

$$\text{Percent water abs.} = 100 \times \frac{W_2 - W_1}{W_1}$$

The spray rating is determined according to ASTM test D 583–54.

The oil repellency rating is determined by placing drops of mixtures of mineral oil and n-heptane on the leather. The composition containing the highest percentage of n-heptane which does not wet the leather under the drop is the oil repellency rating. The scale used is given below:

Oil repellency rating:            Percent n-heptane

100 -------------------------------------------- 50
90 --------------------------------------------- 40
80 --------------------------------------------- 30
70 --------------------------------------------- 20
60 --------------------------------------------- 10
50 --------------------------------------------- 0
0 ------------------------------ (no holdout to oil)

The static oil absorption is determined in similar manner to the water absorption test except that the leather is immersed in the oil to a depth of ¼ inch, and the piece is removed after 10 minutes.

Resistance to hydrochloric acid is determined by placing a 4″ x ½″ sample of the leather to be tested on a smooth horizontal surface and weighting one end for one inch. 37% hydrochloric acid is applied along a strip ⅛″ x ¼″ of the remaining portion 1½″ from the unweighted end. The amount of rise or curl of the leather after 5 minutes is measured in degrees.

Caustic resistance is determined by applying 5 drops of 10 M NaOH preheated to 100° C. to the surface. After 5 minutes, the leather is rinsed and dried. The area under the NaOH drops is examined and reported as: no effect, slight stain, slight burn, severe burn or hole.

The leather employed in the tests is first chrome tanned, retanned with vegetable extracts or syntans, colored and fat liquored according to conventional procedures for tanning and dyeing leathers.

EXAMPLE 1

117 parts of dimethylsulfoxide and 18.5 parts of sodium cyanide were charged to a vessel and heated to 60° C. 109 parts of $(CF_3)_2CFO(CF_2)_4(CH_2)_2I$ were added slowly. The temperature was maintained at 80° C. for five hours. The mixture became viscous. The mixture was cooled to room temperature, washed with water and the organic phase recovered. The product was dried over sodium sulfate and distilled under reduced pressure.

54.5 parts of $(CF_3)_2CFO(CF_2)_4(CH_2)_2CN$, having a boiling point of 99–100° C./0.5 mm. were recovered. The structure was confirmed by infrared analysis which showed a nitrile absorption band at 4.42 microns.

*Elemental analysis.*—Calculated for $C_{10}F_{15}H_5O_3$ (percent): C, 27.3; F, 64.8; H, 0.9; N, 3.2. Found (percent): C, 27.3; F, 65.0; H, 0.9; N, 3.5.

48.5 parts of the nitrile and 75 parts by volume of 70% sulfuric acid were charged to a vessel and heated at 110–120° C. for five hours. The mixture was cooled, and the phases separated. The aqueous phase was washed with ether, and the ether layer combined with the organic phase. This mixture was dried and distilled under reduced pressure.

44 parts of $(CF_3)_2CFO(CF_2)_4(CH_2)_2COOH$ were recovered having a boiling point of 108–110° C./4 mm. The structure was was confirmed by infrared analysis which showed a carboxyl absorption band at 3.2–3.4 microns and a carbonyl absorption band at 5.8 microns.

*Elemental analysis.*—Calculated for $C_{10}F_1H_5O_3$ (percent): C, 26.2; F, 62.3; H, 1.1; Found (percent): C, 27.0; F, 61.9; H, 0.9.

7.0 parts of the acid prepared above and 50 parts by volume of isopropanol were charged to a vessel. A solution containing 7.0 parts of chromyl chloride in 10 parts by volume of carbon tetrachloride was added slowly while stirring. The temperature rose to about 70° C. 40 parts by volume of solvent were distilled off. 0.5 part of water and 34 parts of isopropanol were added. The resultant solution contained about 25% of chromium complex solids.

A portion of the solution is evaporated. A green, solid chromium complex is obtained.

EXAMPLE 2

50 parts by volume of dimethylsulfoxide and 15 parts of sodium cyanide were charged to a suitable vessel and heated to 60° C. 53 parts of $(CF_3)_2CFO(CF_2)_2(CH_2)_2I$ were added when the temperature rose to 85° C. The mixture was cooled to room temperature and washed with water. The water-insoluble oil was recovered, dried over sodium sulfate and distilled under reduced pressure.

29 parts of $(CF_3)_2CFO(CF_2)_2(CH_2)_2CN$ having a boiling point of 68–69° C./10 mm. were recovered. The structure was confirmed by infrared analysis which showed a nitrile band at 4.42 microns.

*Elemental analysis.*—Calculated for $C_8F_{11}H_4NO$ (percent): C, 28.4; F, 61.7; H, 1.2; N, 4.1. Found (percent): C, 27.9; F, 62.2; H, 1.1; N, 4.1.

30 parts of the nitrile and 60 parts of 35% hydrochloric acid were charged to a vessel and heated at 100° C. for 5 hours. The mixture was cooled to room temperature and washed with water. The organic phase was dried and distilled under reduced pressure.

18.4 parts of $(CF_3)_2CFO(CF_2)_2(CH_2)_2COOH$ having a boiling point of 95–96° C./5 mm. were recovered. The structure was confirmed by infrared analysis which showed a carboxyl band at 3.2 microns and a carbonyl band at 5.8 microns.

*Elemental analysis.*—Calculated for $C_7F_{11}H_5O_3$ (percent): C, 26.8; F, 58.4; H, 1.4. Found (percent): C, 27.1; F, 58.6; H, 1.5.

The chromium complex solution prepared from the above acid was prepared as in Example 1 and adjusted to contain about 25% of chromium complex solids.

EXAMPLE 3

516 parts of $(CF_3)_2CFOCF_2CF_2CF_2I$, 198 parts of methyl undecenoate and 4.1 parts of azobisisobutyronitrile were charged to a vessel fitted with a stirrer, thermometer and condenser and warmed to 70–80° C. An exothermic reaction occurred. The mixture was maintained at 70–80° C. for one hour and at 90–95° C. for 4 hours longer. The unreacted ether iodide was distilled off.

640 parts of the corresponding ester,

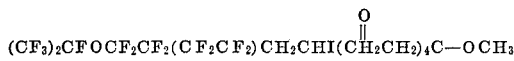

were obtained.

The product was added dropwise over about 1.5 hours to a vessel containing 1500 parts by volume of acetic acid heated to 110–115° C. and 65 parts of zinc dust. An additional 65 parts of zinc dust were added after about half the ester product was charged. 20 parts more of zinc dust were added and the mixture was refluxed for 5 hours. The mixture was poured into 3000 parts of water and the layers separated. The aqueous layer was washed with ether and the washings combined with the organic layer. The organic layer was washed with water, dried over magnesium sulfate and distilled.

327 parts of $$(CF_3)_2CFOCF_2CF_2CF_2CF_2(CH_2CH_2)_5COOCH_3$$

were recovered having a boiling point of 148–155° C./2.5 mm. This ester was hydrolyzed to the acid by heating with 32 parts of sodium hydroxide in 300 parts by volume of alcohol and 100 parts of water in a steam bath for three hours and neutralizing. The acid product was recrytallized from petroluem ether.

298 parts of $(CF_3)_2O(CF_2CF_2)_2(CH_2CH_2)_5COOH$ were obtained having a melting point of 54–56° C.

17.1 parts of the acid product were dissolved in 125 parts of isopropanol. 14.0 parts of chromyl chloride dissolved in 20 parts by volume of carbon tetrachloride were added slowly. 100 parts by volume of solvent were distilled off. 0.8 part of water was added and the mixture was diluted to 103 parts by volume with isopropanol to form the desired chromium complex solution.

EXAMPLE 4

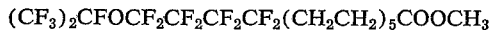

was prepared following the procedure given in Example 3 from methyl undecenoate and the appropriate iodide. A 67% yield of the ester was obtained having a boiling point of 129–136° C./2.5 mm.

The ester was hydrolyzed to the acid following the procedure of Example 3.

$(CF_3)_2CFOCF_2CF_2(CH_2CH_2)_5COOH$ was obtained having a melting point of 34–36° C.

The chromium complex of the acid product was prepared as in Example 3 utilizing 15.7 parts of the acid and 15.5 parts of chromyl chloride.

EXAMPLE 5

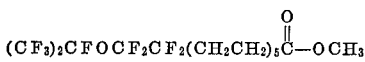

was prepared following the procedure given in Example 3 from methyl undecenoate and the appropriate iodide. A 54% yield of the ester was obtained having a boiling point of 148–154° C./1.5 mm. The ester was hydrolyzed to the corresponding acid following the procedure of Example 3.

$(CF_3)_2CFOCF_2CF_2(CF_2CF_2)_2(CH_2CH_2)_5COOH$ was obtained having a melting point of 61–65° C.

The chromium complex of the acid product was prepared as in Example 3 utilizing 20.1 parts of the acid and 14.0 parts of chromyl chloride. The mixture was diluted with isopropanol to 113 parts by volume.

EXAMPLE 6

$(CF_3)_2CFO(CF_2CF_2)_4(CH_2CH_2)_5COOCH_3$ was prepared from methyl undecenoate and the appropriate iodide following the procedure of Example 3. A 63% yield of the ester was obtained having a boiling point of 130–136° C./0.1 mm. The ester was hydrolyzed to the acid according to the procedure of Example 3.

$(CF_3)_2CFO(CF_2CF_2)_4(CH_2CH_2)_5COOH$ was obtained having a melting point of 82–85° C.

The chromium complex of the acid product was prepared as in Example 3 utilizing 19.3 parts of the acid and 11.7 parts of chromyl chloride. The mixture was diluted to 100 parts by volume with isopropanol.

EXAMPLE 7

52 parts of potassium hydroxide were dissolved in 150 parts of anhydrous ethanol. 200 parts of

were added slowly over a two-hour period and the mixture was refluxed at 64° C. for 14 hours. A white precipitate of potassium iodide formed. The mixture was cooled to room temperature, and the organic layer collected. The organic solution was washed with water, dried over sodium sulfate, filtered and distilled.

113 parts (72% yield) of

having a boiling point of 78–79° C. were obtained. The structure was confirmed by infrared analysis.

*Elemental analysis.*—Calculated for $C_7F_{11}H_3O$ (percent): C, 26.9; F, 70.0; H, 1.0. Found (percent): C, 26.5; F, 66.2; H, 0.9.

50.5 parts of potassium permanganate, 10.5 parts of potassium hydroxide and 200 parts of water were charged to a vessel and heated to 100° C. 150 parts of

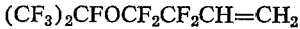

as prepared above were added slowly. The mixture was heated at 64° C. for 2.5 hours. The mixture was neutralized with sulfuric acid, filtered and the water-insoluble oil collected, dried and distilled.

20.7 parts of $(CF_3)_2CFOCF_2CF_2COOH$ were obtained having a boiling point of 79.5–80.5° C. The structure was confirmed by infrared analysis. The acid number was 338.4; theoretical is 330.1.

*Elemental analysis.*—Calculated for $C_6F_{11}HO_3$ (percent): C, 21.8; F, 63.3; H, 0.30. Found (percent): C, 22.0; F, 63.8; H, 0.45.

6.7 parts of the acid prepared above were dissolved in 36 parts of isopropanol. 9.3 parts of chromyl chloride in 10 parts by volume of carbon tetrachloride were added dropwise, maintaining the solution below about 35° C. by cooling in ice. 0.5 part of water and 4.5 parts of isopropanol were added. The solution contained 22% solids.

EXAMPLE 8

Unsized paper sheets were dipped into a solution of the chromium complex prepared in Example 1, diluted to contain about 1% of the chromium complex. Excess soluwas blotted off and the sheets dried at 115–125° C. for two minutes. Drops of oil and water deposited on the sized sheets did not wet the paper.

EXAMPLE 9

Unsized weighed paper sheets dipped into solutions prepared from the chromium complex of Example 1 diluted to various concentrations. The sheets were blotted dry and reweighed to determine the amount of pickup.

The sheets were tested for oil and water repellency. The results are given below:

| Percent chromium complex applied | Kit No. | Cobb size | Ink flotation |
|---|---|---|---|
| 1.0 | 12 | 16.0 | 900+ |
| 0.5 | 12 | 16.4 | 900+ |
| 0.25 | 12 | 18.4 | 900+ |
| 0.13 | 10–11 | 20.8 | 900+ |
| 0.06 | 9 | 24.4 | 900+ |
| 0.5 [1] | 12 | 18.8 | 900 |

[1] pH of solution adjusted to 7.0 with KOH.

Thus, this chromium complex imparted excellent water, ink and oil resistance to paper.

EXAMPLE 10

Unsized paper sheets were sized with a solution of the chromium complex of Example 2 and tested for oil and water resistance. The results are given below:

| Percent chromium complex applied | Kit No. | Cobb size | Ink flotation |
|---|---|---|---|
| 1.0 | 7 | ---- | 900+ |
| 0.5 | 8 | 21.2 | 900+ |
| 0.25 | 7 | 24.2 | 900+ |
| 0.13 | 4 | 29.2 | 900+ |
| 0.06 | 4 | 47.2 | 900+ |
| 1.0 [1] | 11 | 23.4 | 900+ |
| 0.5 [1] | 8 | 23.2 | 900+ |
| 0.25 [1] | 8 | 24.8 | 900+ |

[1] pH adjusted to 5.5 with KOH.

EXAMPLE 11

The chromium complex solution prepared as in Example 3 was diluted with water to various concentrations and paper sheets treated with the solutions. The results are given below:

| Percent chromium complex applied | Kit No. | Cobb size | Ink flotation |
|---|---|---|---|
| 0.5 | 11 | 13.2 | 900+ |
| 0.25 | 11 | 19.2 | 900+ |
| 0.13 | 10 | 22.8 | 900+ |
| 0.06 | 9 | 24.4 | 900+ |

The treated sheets gave excellent resistance to both oil and aqueous solutions. Drops of vegetable oil were placed on the sheets. They did not penetrate the paper after several days.

EXAMPLE 12

The chromium complex solution prepared as in Example 5 was diluted with water to various concentrations. Paper sheets were treated with the solution and tested for oil and water resistance as given below:

| Percent chromium complex applied | Kit No. | Cobb size | Ink flotation |
|---|---|---|---|
| 0.5 | 11 | 19.6 | 900+ |
| 0.25 | 10 | 20.8 | 900+ |
| 0.13 | 9 | 25.6 | 900+ |
| 0.06 | 8 | 25.2 | 900+ |

Drops of oil placed on the treated paper did not penetrate after several days.

EXAMPLE 13

Paper handsheets were treated with the chromium complex solution of Example 6 and tested as in Example 12. The results are given below:

| Percent chromium complex applied | Kit No. | Cobb size |
|---|---|---|
| 0.5 | 8–9 | 21 |
| 0.13 | 6–7 | 23 |

EXAMPLE 14

Paper handsheets were treated with the chromium complex solution of Example 4 and tested as in Example 12. At a concentration of 0.5%, the kit number was 9. At a concentration of 0.1%, the kit number was 7.

EXAMPLE 15

Unsized paper handsheets were treated with the solution prepared in Example 7 diluted to various concentration of solids with water and tested for oil and water resistance. The results are given below:

| Percent chromium complex applied | Kit No. | Cobb size | Ink flotation |
|---|---|---|---|
| 1.0 | 5 | 52.0 | 200 |
| 0.5 | 5 | 24.0 | 800 |
| 0.25 | 4 | 28.0 | 900+ |
| 0.13 | 3 | 33.6 | 600 |
| 0.06 | 2 | 95.6 | 60 |

EXAMPLE 16

Samples of wet, weighed pigskin were treated with an aqueous solution of the chromium complex prepared in Example 7 at 40–50° C. for about 3 hours. The treated pigskins were rinsed, pulled, stretched, and dried. The treated pigskins were tested for oil, chemical and water repellency, and compared to an untreated control. Test data is summarized in the table below:

| | Treated sample | Control |
|---|---|---|
| Static water absorption, percent | 61 | 100 |
| Spray rating | 70 | 0 |
| Static oil absorption, percent | 33.5 | 100 |
| Oil repellency rating | 60+ | 0 |
| HCl resistance | [1] | [2] |
| Caustic resistance | [3] | [4] |

[1] No curl.
[2] Curled.
[3] Very slight stain.
[4] Burned.

EXAMPLE 17

1.0% solutions of chromium complexes of the invention were applied to paper sheets by a hand draw down with a No. 5 Meyer bar. The coated paper sheets were placed between blotting sheets and dried at 250° F. for one minute.

The coated sheets were tested for release and subsequent adhesion according to the following procedure: three six-inch strips ach of Johnson & Johnson "Red Cross" adhesive tape and of Mystik Transparent tape (Borden Co.) were applied to the paper resting on a plate glass surface by rolling four times with a four pound roller. The tape-on-paper laminates were then placed between two flat metal plates and weights placed on the upper plate so that pressure of 0.25 lb./in.² was maintained on the tapes. The samples were aged at varing time and temperature and cooled to room temperature. The force required to remove the tape from the paper was measureded by means of a Keil Tester, Model 2 which strips the tapes from the paper at a constant speed pull of 12"/min. 5–6 readings were taken as each tape was stripped from the paper. The average of the readings is reported as the release force in grams/inch width. Low values indicate good release.

The subsequent adhesion of the tapes to a stainless steel plate using two passes of the four pound roller was measured. The force required to remove the tapes from the steel plate were measured as described above. High values indicate good subsequent adhesion of the tapes, whereas low values indicate that considerable migration of the release agent onto the tapes has occurred. The data is summarized below wherein a sheet of the untreated paper was used as a control.

| Compound | Ageing conditions | Adhesive tape | | Transparent tape | |
|---|---|---|---|---|---|
| | | Release | Subsequent adhesion | Release | Subsequent adhesion |
| Example 3 | 1 hr. at 25° C | 310 | 508 | 347 | 582 |
| | 1 hr. at 70° C | 298 | 544 | 307 | 611 |
| | 16 hr. at 70° C | 364 | 585 | 352 | 348 |
| Example 4 | 1 hr. at 25° C | 245 | 430 | 188 | 579 |
| | 1 hr. at 70° C | 346 | 515 | 299 | 456 |
| | 16 hr. at 70° C | 413 | 437 | 386 | 510 |
| Example 5 | 1 hr. at 25° C | 236 | 403 | 371 | 459 |
| | 1 hr. at 70° C | 300 | 514 | 289 | 475 |
| | 16 hr. at 70° C | 293 | 547 | 451 | 460 |
| Example 6 | 1 hr. at 25° C | 235 | 445 | 279 | 449 |
| | 1 hr. at 70° C | 282 | 402 | 289 | 455 |
| | 16 hr. at 70° C | 296 | 589 | 306 | 417 |
| Control | 1 hr. at 25° C | Ripped | 500 | Ripped | 916 |

EXAMPLES 18-26

Chromium complexes of additional fluorocarbon acids are prepared according to procedures described hereinabove and are effective oil and water repellency agents. The structural formulas of the fluorocarbon acids are set forth below:

Example 18

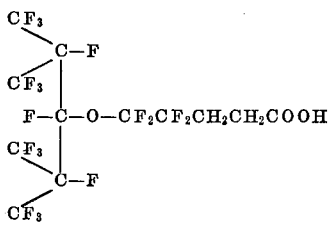

Example 19

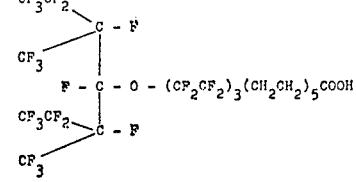

Example 20

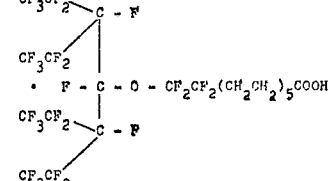

Example 21

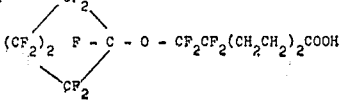

Example 22

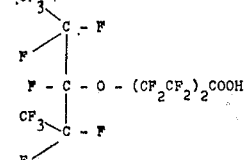

Example 23

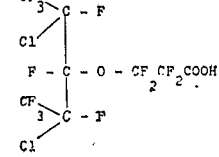

Example 24

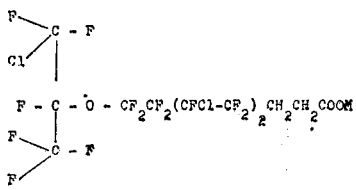

Example 25

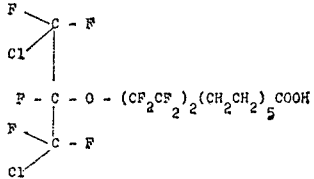

Example 26

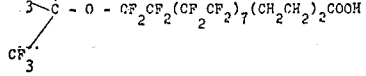

It will be apparent that numerous modifications and variations may be effected without departing from the novel concepts of the present invention and the illustrative details disclosed are not to be construed as imposing undue limitations on the invention.

I claim:

1. Werner-type chromium complexes of a fluorocarbon carboxylic acid of the formula:

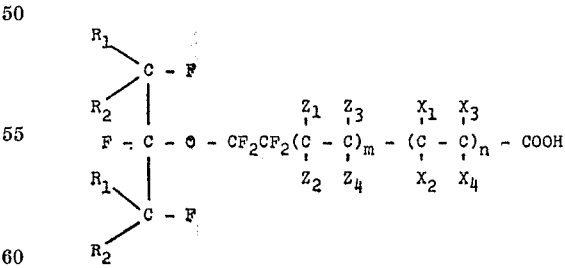

wherein $R_1$ and $R_2$ independently can be fluorine, chlorine, perfluoroalkyl or together can form a cyclic perfluoroalkylene group with the proviso that at least one of $R_1$ and $R_2$ is fluorine when the other is chlorine; $Z_1$, $Z_2$, $Z_3$ and $Z_4$ are independently selected from the group consisting of hydrogen, fluorine and chlorine, with the proviso that no more than two of $Z_1$–$Z_4$ are chlorine; $X_1$, $X_2$, $X_3$ and $X_4$ are independently selected from the group consisting of hydrogen, chlorine and fluorine with the proviso that no more than one of $X_1$–$X_4$ is chlorine; $m$ and $n$ are integers from 0–75 and the sum of $m$ and $n$ is 0–75.

2. Werner-type chromium complexes according to claim 1 wherein $m$ and $n$ are integers from 0–10.

3. Werner-type chromium complexes according to claim 1 wherein said acid has the formula:

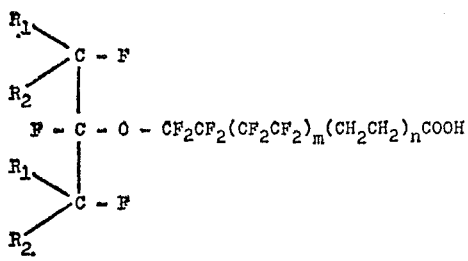

wherein $R_1$ and $R_2$ are fluorine or perfluoroalkyl of 1–2 carbon atoms, and $m$ and $n$ are integers from 0–10.

4. Werner-type chromium complexes according to claim 3 wherein $R_1$ and $R_2$ are fluorine.

5. Werner-type chromium complexes of an acid of the formula

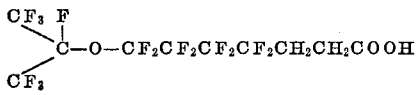

6. Werner-type chromium complexes of an acid of the formula

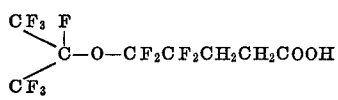

7. Werner-type chromium complexes of an acid of the formula

8. Werner-type chromium complexes of an acid of the formula

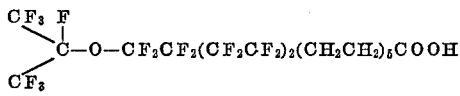

9. Werner-type chromium complexes of an acid of the formula

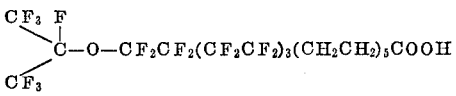

10. Werner-type chromium complexes of an acid of the formula

11. Werner-type chromium complexes of an acid of the formula

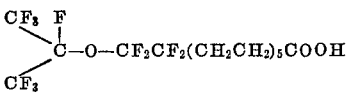

12. Werner-type chromium complexes according to claim 3 wherein $m$ is from 0–3 and wherein $n$ is from 1–5.

13. Werner-type chromium complexes according to claim 12 wherein $n$ is 5.

14. Werner-type chromium complexes according to claim 3 of an acid of the formula

References Cited
UNITED STATES PATENTS

| | | | |
|---|---|---|---|
| 2,662,835 | 12/1953 | Reid | 260—438 C UX |
| 2,693,458 | 11/1954 | Olson | 260—438 C UX |
| 2,713,593 | 7/1955 | Brice | 260—535 |
| 2,904,571 | 9/1959 | La Fleur | 260—438.5 |
| 2,909,545 | 10/1959 | Barnhart | 260—438.5 |
| 3,088,958 | 5/1963 | Eleuterio | 260—438.5 |
| 3,409,647 | 11/1968 | Pittman et al. | 260—408 |
| 3,453,333 | 7/1969 | Litt et al. | 260—614 |

TOBIAS E. LEVOW, Primary Examiner

H. M. S. SNEED, Assistant Examiner

U.S. Cl. X.R.

117—121, 126, 138.8, 139, 142, 143, 147, 152; 252—8.57, 8.6; 260—408